US 10,561,078 B2

United States Patent
Darnold (10) Patent No.: US 10,561,078 B2
(45) Date of Patent: *Feb. 18, 2020

(54) DEVICE FOR MONITORING AND CONTROLLING WATER FLOW

(71) Applicant: Richard Alan Darnold, Las Vegas, NV (US)

(72) Inventor: Richard Alan Darnold, Las Vegas, NV (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/042,857

(22) Filed: Jul. 23, 2018

(65) Prior Publication Data

US 2018/0338435 A1    Nov. 29, 2018

Related U.S. Application Data

(63) Continuation of application No. 14/460,342, filed on Aug. 14, 2014, now Pat. No. 10,039,240.

(60) Provisional application No. 61/865,764, filed on Aug. 14, 2013.

(51) Int. Cl.
    *A01G 25/16*    (2006.01)
(52) U.S. Cl.
    CPC ........... *A01G 25/16* (2013.01); *Y02A 40/237* (2018.01)
(58) Field of Classification Search
    CPC ....................................................... A01G 25/16
    USPC ................................................. 700/275–306
    See application file for complete search history.

(56) References Cited

U.S. PATENT DOCUMENTS

| | | | |
|---|---|---|---|
| 3,495,803 A | 2/1970 | Schoepe et al. |
| 3,537,111 A | 11/1970 | Whitten, Jr. |
| 5,287,570 A | 2/1994 | Peterson et al. |
| 5,341,839 A | 8/1994 | Kobayashi et al. |
| 5,721,383 A | 2/1998 | Franklin |
| 6,929,187 B2 | 8/2005 | Kempf et al. |
| 7,050,887 B2 | 5/2006 | Alvarez |
| 7,360,413 B2 | 4/2008 | Jeffries |
| 7,669,461 B2 | 3/2010 | Kates |
| 7,720,574 B1 | 5/2010 | Roys |
| 7,789,321 B2 | 9/2010 | Hitt |
| 7,979,928 B2 | 7/2011 | Allen |
| 8,188,873 B2 | 5/2012 | Barth |
| 8,245,720 B2 | 8/2012 | Grill |
| 8,677,806 B2 | 3/2014 | Ahdout |
| 8,833,390 B2 | 9/2014 | Ball |
| 8,866,634 B2 | 10/2014 | Williamson |
| 8,887,324 B2 | 11/2014 | Klicpera |

(Continued)

OTHER PUBLICATIONS

Srinivasan, Vijay, John Stankovic, and Kamin Whitehouse. "Watersense: Water flow disaggregation using motion sensors." Proceedings of the Third ACM Workshop on Embedded Sensing Systems for Energy-Efficiency in Buildings. ACM, 2011.pp. 19-24 (Year: 2011).*

(Continued)

*Primary Examiner* — Satish Rampuria
(74) *Attorney, Agent, or Firm* — Lewis Roca Rothgerber Christie LLP (57) ABSTRACT

The present system identifies leaks in irrigation systems by monitoring the overall flow at an irrigation system valve. The system may monitor typical flow rates and may send a signal to shut off an irrigation system valve if an unexpected or excessive flow rate is detected. The present technology can be used in traditional sprinklers, drip irrigation systems, and other irrigation systems.

12 Claims, 5 Drawing Sheets

(56) References Cited

U.S. PATENT DOCUMENTS

| | | | |
|---|---|---|---|
| 8,903,558 B2* | 12/2014 | Jarrell | F17D 5/00 700/282 |
| 9,019,120 B2 | 4/2015 | Broniak | |
| 9,105,181 B2 | 8/2015 | Pitchford | |
| 2001/0044670 A1* | 11/2001 | Johansson | D21D 1/002 700/128 |
| 2004/0217189 A1* | 11/2004 | Regli | A01G 25/167 239/69 |
| 2005/0000277 A1 | 1/2005 | Giles | |
| 2005/0137752 A1 | 6/2005 | Alvarez | |
| 2005/0167625 A1 | 8/2005 | Deen | |
| 2006/0010865 A1 | 1/2006 | Walker | |
| 2006/0124171 A1 | 6/2006 | Ghazarian | |
| 2006/0174707 A1 | 8/2006 | Zhang | |
| 2006/0272704 A1 | 12/2006 | Fima | |
| 2010/0057382 A1 | 3/2010 | Li | |
| 2011/0298635 A1 | 12/2011 | Yip | |
| 2012/0084023 A1 | 4/2012 | Mavridoglou | |
| 2012/0150455 A1 | 6/2012 | Franklin | |
| 2013/0105010 A1 | 5/2013 | McLoughlin | |
| 2013/0248028 A1 | 9/2013 | Estrada, Jr. | |
| 2013/0317659 A1* | 11/2013 | Thomas | H04W 52/0216 700/286 |
| 2014/0000729 A1 | 1/2014 | Meyer | |
| 2014/0026644 A1 | 1/2014 | Patel | |
| 2014/0203102 A1 | 7/2014 | Gilpatrick | |
| 2014/0245208 A1 | 8/2014 | Javey | |
| 2014/0278246 A1 | 9/2014 | Clark | |
| 2015/0286222 A1* | 10/2015 | Goldstein | G05D 7/0635 700/282 |

OTHER PUBLICATIONS

Kung, Hsiang-Cheng, et al. "Sprinkler protection of non-storage occupancies with high ceiling clearance." Fire safety journal 54 (2012): pp. 49-56. (Year: 2012).*

Kranz, William. "Monitoring irrigation water application with computerized controllers." 2009 Central Plains Irrigation Conference. vol. 200. 2009.pp. 144-154 (Year: 2009).*

Alley, William M., et al.(Jun. 14, 2002) "Flow and Storage in Groundwater Systems," Science, vol. 296 (5575), pp. 1985-1990.

Evans et al., (2012) "Integrated Decision Support, Sensor Networks, and Adaptive Control for Wireless Site-Specific Sprinkler Irrigation," Applied Engineering in Agriculture, American Society of Agriculture and Biological Engineers, ISSN 0883-8542, V. 28 (3), p. 377-387.

Ostrom, Elinor, et al., (Autumn, 1993) "Coping with Asymmetries in the Commons: Self-Governing Irrigation Systems Can Work," The Journal of Economic Perspectives, vol. 7, No. 4, pp. 93-112.

Younghun, Kim, et al. (2008) "NAWMS: Nonintrusive Autonomous Water Monitoring System, Proceedings of the 6th ACM conference on Embedded Network Sensor Systems," ACM, pp. 309-321.

* cited by examiner

DEVICE FOR MONITORING AND CONTROLLING WATER FLOW

CROSS-REFERENCE TO RELATED MATTERS

This is a continuation application of U.S. patent application Ser. No. 14/460,342, filed Aug. 14, 2014, which claims priority to and benefit of U.S. Provisional Application Ser. No. 61/865,764, filed Aug. 14, 2013 entitled "DEVICE FOR MONITORING AND CONTROLLING IRRIGATION," the entire content of which is hereby expressly incorporated herein by reference.

BACKGROUND

Field of the Invention

The present invention is related to monitoring water flow, and in particular is related to automated monitoring and control for irrigation systems.

Description of the Prior Art

Water and water conservation are becoming extremely more important due to climate changes and unprecedented drought conditions both domestically and globally. Historically, detection of water flow problems, such as that from a broken or malfunctioning lawn sprinkler head or broken or malfunctioning drip irrigation systems, has been limited to visual identification either from a 'geyser' of water where the sprinkler should be or from an unusually wet spot around the sprinkler or from landscaping and/or lawn that is turning brown due to lack of water. Leaks in general are usually located by visual observation of the leaked water.

In some cases, such as on boats, leaking water can be detected by sensors placed in such a way to detect water before the leak becomes a significant problem. However, in systems such as home or commercial lawn irrigation systems, it is impractical to deploy a sufficient sensor array to detect a leak without visual observation. Further, most home and commercial sprinkler leaks occur during watering cycles when either the home occupants or other owners/users are not likely to observe the leaking water. Detection typically does not occur until further damage has occurred, such as washing out of soil in the area or water damage to a fence or wall or noticeable changes in landscape such as the grass turning brown or foliage dying.

Some attempts have been made to commercialize sprinkler leak suppression at the sprinkler heads. This is somewhat impractical for general use because it requires a large number of detectors (one for every sprinkler head). Further, it does not protect against a break in the supply lines, nor is it practical for use in 'drip' irrigation heads which have very low flow.

What is needed is an improved method for monitoring and controlling irrigation as well as a system that is easy to install for existing irrigation systems.

SUMMARY

The present technology solves the leak detection problem in irrigation systems by monitoring the overall flow at an irrigation system valve. The system may monitor typical flow rates and may send a signal to shut off an irrigation system valve if an unexpected or excessive flow rate is detected. The present technology can be used in traditional sprinklers, drip irrigation systems, and other irrigation systems.

In embodiments, the present technology may include a method may monitor fluid flow. The method may include monitoring fluid flow through a fluid flow system. A baseline flow level may be determined by circuitry in communication with the fluid flow system. Subsequent flow may be compared to a threshold based on the baseline. The fluid flow may be adjusted in the fluid flow system by the circuitry based on the comparison.

In embodiments, a system may be used to monitor fluid flow. The system may include a sensor, circuitry, a control valve, and a controller. The circuitry may be in communication with the sensor and control valve and the control valve may control flow of a fluid. The circuitry may determine a baseline fluid flow based on data received from the sensor and generate a signal to adjust the fluid flow based on a comparison of subsequent fluid flow and a threshold associated with the baseline.

DETAILED DESCRIPTION

The present water flow monitoring and control system measures and monitors the flow of water provided to and processed through a watering system. The device utilizes a sensor such as a pressure or flow detector in or adjacent to a supply pipe placed before or after the control valve. The sensor may be monitored by a circuit which is designed to monitor the pressure and flow. The system may monitor typical flow rates and may send a signal to shut off or modify the flow of a water flow system valve if an unexpected or excessive flow rate is detected.

A valve may be an active control device that may control the flow rate of water through a branch of a water flow system such as an irrigation system. A manifold may be an inactive device that distributes water to one or more branches of an irrigation system. For example, a valve may turn water flow on or off for one or more branches of the irrigation system. The device could shut off the flow until manually reset or could shut it off for a period of time and then reset itself. In some instances, the system may instruct the valve to limit the flow rather than shutting it off entirely. For valves which cannot open partially, this could be accomplished by periodically opening and closing the valve.

When a flow level exceeds a threshold, indicating a potential leak or other flow abnormality or unexpected condition, an alert may be generated. The alert may include an audible alarm, text, visual indicator, communication to another device, or some other form of communication. Such communications could be through wired, wireless, or other methods to connect with local or remote systems which are devised to monitor for such alarms. Alerting could be delayed instead of instant by recording the information for later retrieval.

The present monitoring system could be configured to recognize flow patterns at different times of the day, week, month, year, or any other cycle of time, and generate an alert based on the measured flow. The present system may 'learn' a normal water flow pattern or patterns over a period of time, and then enter a mode where the present system 'enforces' the pattern or patterns with thresholds placed at pattern boundaries and alerts. The present system may have multiple monitoring modes (for example monitoring based on learned baselines determined on a daily basis, weekly basis, monthly basis), or could be programmed to be both learning and enforcing at the same time.

Multiple patterns or flows could be monitored with different triggers to indicate a problem. They could be simultaneous or set for different times or for some other control to set the different monitoring modes.

Detectors may be placed at strategic locations in the system. For example, a version of the detector could be incorporated into the valve mechanism or could replace the valve entirely with normal control logic in addition to leak detection. Other variations could utilize the device for general water supply monitoring, for example when tuned to the typical water flow utilization of a household. For instance, the present technology could alert a homeowner to an unexpected increase in flow which might indicate a hidden leak in the system. Such leaks include failed toilet valves or leaking sinks, or larger leaks such as a swimming pool supply line.

In some embodiments, other variations could utilize the device for flow of substances other than water, such as chemicals in a manufacturing facility with a predictable flow which suddenly changes, indicating a leak in the plant; or a leak in a coolant line; or a leak in a powdered substance delivery line. Virtually any substance with a predictable flow rate could be monitored by such a device.

The present technology can be used in both traditional sprinklers, drip irrigation systems, and other irrigation systems. Additionally, though the present system is discussed herein with respect to water flow monitoring, it can be further expanded to monitoring any substance in any controlled flow setting where an undesired change in flow could be detected.

There are devices in the marketplace which are purely mechanical and need to be installed at each one of the sprinkler heads. This "every sprinkler head" technology is not adaptable to drip irrigation systems which are becoming more prevalent with increasing climate change and drought conditions, and are not easily scalable to larger systems. The "every sprinkler head" technology also does not address when there are damages to the piping which commonly occurs.

The present system may utilize and leverage existing technology at one or more valves instead of at each and every sprinkler head. With a combination of mechanical water flow metering, a micro-chip and software, the present system requires fewer devices than those of the prior art and will also has the tolerances be able to manage water flow and loss related to drip irrigation systems.

Figure 1:
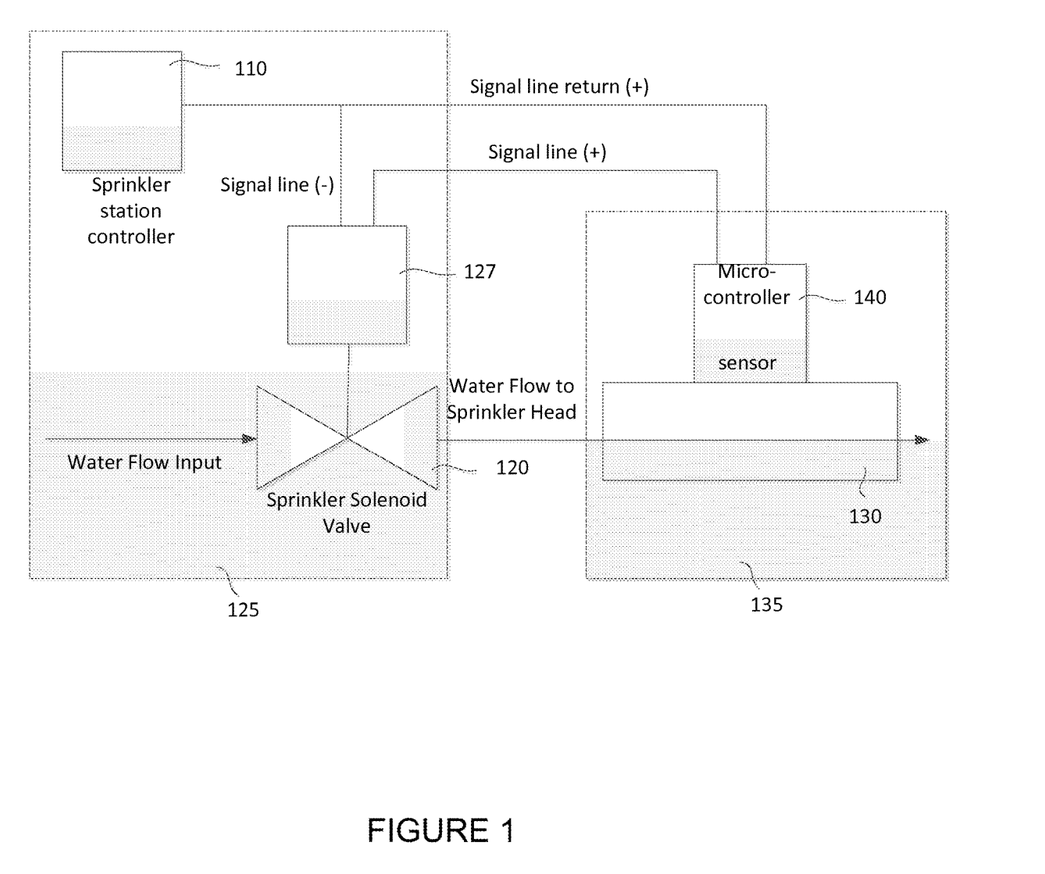
FIG. 1 is a block diagram of an water flow control system

FIG. 1 is a block diagram of an irrigation control system. The system of FIG. 1 includes a sprinkler control system and an electronic sprinkler leak detector system. The sprinkler control system includes a sprinkler station controller 110 and a sprinkler solenoid valve 120 located at a manifold 125. The sprinkler station controller 110 provides a signal line to the sprinkler solenoid valve and receives a signal from a microcontroller 140 within the electronic sprinkler leak detector system 130. The sprinkler solenoid valve receives a water flow input and is controlled by a water flow controller 127.

The water flow controller 127 receives a signal line from the sprinkler station controller 110 and a signal line from the microcontroller 140.

The electronic sprinkler leak detector system 135 may be inserted into the irrigation distribution system and includes a water flow detector and a microcontroller. The water flow detector 130 may include a water flow detection mechanism, such as for example a paddle wheel or some other mechanism for detecting water flow, and a sensor that detects the water flow information and is able to communicate the information to the microcontroller 140. The flow sensor may be implemented as a segment to be connected in-line with the pipe, or it could be installed into the side of the pipe itself through a hole or self-tapping connection. The information may be communicated mechanically, electronically, wirelessly, or in some other manner. The electronic sprinkler leak detector system may initialize during normal sprinkler operation and set a programmed shutoff threshold. Based on the detected water flow, the electronic sprinkler leak detector system may transmit a signal to the solenoid valve on the Manifold to close.

A flow detector may be placed in or adjacent to the supply pipe before or after the manifold valve. The flow detector may be monitored by a circuit which is designed to monitor the flow of water, and is programmable to "learn" normal water flow rates for a specific station. If water flow exceeds certain "normal" levels, tolerances may be programmed into the microchip and the present system determines if there is excessive flow. If excessive water flow is determined while the system or manifold is in operation, the present system sends a signal to the Manifold and interrupts the low voltage power supply and closes the valve.

The present system can be programmed to follow a variety of protocols, for example shutting the valve off for the remainder of the time of that specific Manifold's watering cycle and then reset itself for the next water cycle and repeating the monitoring program for that station. The present system could be programmed to instruct the valve to limit the flow rather than shutting it off entirely. For valves which cannot open partially, this could be accomplished by periodically opening and closing the valve.

The present system may have a visual or audio indicator that may provide notification of a problem. The repair person could hit an over-ride button that would allow the valve to remain open so that the repair person could visually inspect where the problem is.

Because the present system may be connected to a timer (e.g., implemented by the controller), the program could be adapted with an integrated time clock that would have a visual or audio signal identifying a problem. The programming and wireless connection can be incorporated in the time clock thus serving as the master controller and connectivity point for the present system.

The present system can be installed in a variety of ways such as connecting downstream from each of one or more manifolds in the irrigation system or "upstream" to monitor several manifolds. The present system is designed to be easily installed using existing PVC pipe fittings with a self-tapping connection for the mechanical piece and an integrated water proof/resistant microchip. The present system can also be designed to incorporate the microchip functionality as part of the manifold and/or as part of the time clock itself.

Figure 2:
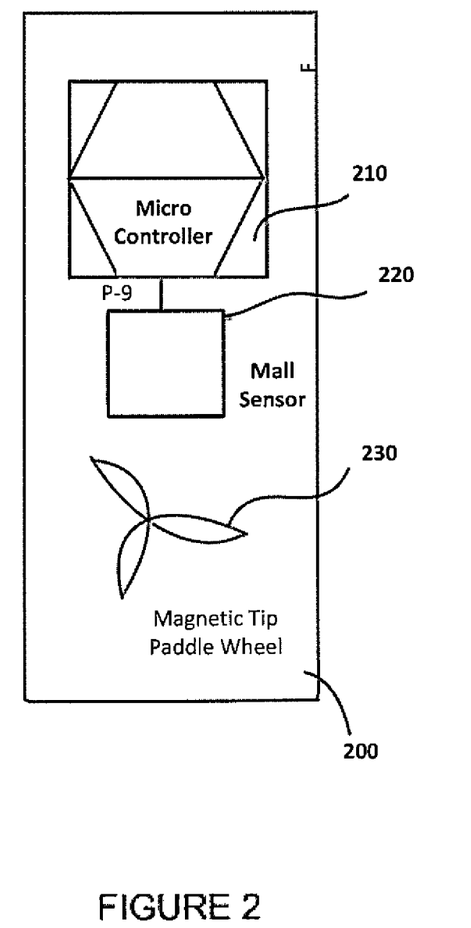
FIG. 2 is a block diagram of a leak detector system.

FIG. 2 is a block diagram of a leak detector system. Leak detector system 200 includes a microcontroller 210, sensor 220, and flow detector 230. In the example illustrated, the flow detector is a magnetic tipped paddle wheel and the sensor may include a Hall sensor. Leak detector system 200 provides an exemplary implementation for electronic sprinkler leak detector system 135. Other implementations may be used based on design preference and the scope of the present technology is not intended to be limited to the implementation provided in FIG. 2.

The shut-off valve system of the present technology may include intelligence for determining when a particular pipe, sprinkler head or drip system is leaking. The intelligence may be included in a leak detection system and may operate to determine a baseline of water flow for one or more branches of a water system. Water flow measurement data for a period of time, such as for example an hour, several hours, a day, or some other time period, may be reported to a system controller. The controller may determine a baseline from the reported data and determine if the current flow is within the baseline or within an allowed tolerance of the baseline, such as within ten percent of the baseline. A baseline may be determined for each and every water line in a distributed water system, groups of selected water lines, or some other configuration of waterlines in a water system.

A baseline may be determined from the water flow measurement data, and may be determined as a single value or a range of values. For example, the baseline may include an average of the water flow over time. The baseline may be determined as the average water flow as determined from the water flow measurement data from one or more periods of time, such as the last hour. The baseline may be determined as the average water flow over several periods of time, such as the water flow from 6:00 AM to 10:00 AM the previous three days. Other methods of determining a baseline from the water flow measurement data may also be utilized.

The present system may generate an alert if a system is detected to not be functioning according to a particular threshold. Alerts may include a visible indicator, an audible alarm, or communication to another device. Such communications could be through wired, wireless, or other methods to connect with local or remote systems which are devised to monitor for such alarms. Alerting could be delayed instead of instant by recording the information for later retrieval.

When a leak is detected in the water system, for example in the form of reduced water pressure or a violation of an allowed tolerance from a baseline water flow, the control system may generate and transmit a notification. The notification may indicate a level of importance, the details of the detected water flow, and one more water lines associated with the detection. For example, if the water flow is detected to be outside a tolerance for a first period of time, such as five minutes, a first low level notification may be generated. If the water flow is detected to be outside a tolerance for twenty minutes or more within a period of one hour, a second notification having a higher importance may be generated.

A notification may provide water line identification and other data to a system administrator. For example, a notification may include water flow information such as average water flow, maximum water flow, and minimum water flow for a period of time associated with the alert. When the alert is associated with a baseline, the alert may also include information associated with the particular baseline used to generate the alert, for example when the baseline data was collected. In embodiments, alerts may be configured by a user to include whatever information and format preferred to the user. The alerts may be delivered in any of several formats, such as SMS notification, email, phone call, and other formats.

Embodiments of the present system can be configured, for example via programming the controller, to recognize flow patterns at different times of the day, or of the week, or month, or year, or during any predictable cycle of time, and then raise an alert through any appropriate method. Multiple patterns or flows could be monitored with different triggers to indicate a problem. They could be simultaneous or set for different times or for some other control to set the different monitoring modes.

The present system does not have to be placed near the supply valve, but could be placed at strategic locations in the Watering System. For example, a version of the present system could be integrated as part of the valve and/or the Timer/controller with normal control logic in addition to flow detection.

Other variations could utilize the present system for general water supply monitoring, for example when tuned to the typical water flow utilization of a household, an advanced version of the device could alert the homeowner to an unexpected increase in flow which might indicate a hidden leak in the system. Such leaks include failed toilet valves or leaking sinks, or larger leaks such as a swimming pool supply line. As an example, NV Energy has moved to install SmartMeter which users can go online and look at their power usage. The present system can be similarly used to be incorporated in any SmartMeter for water use.

Other variations could utilize the device for flow of substances other than water, such as chemicals in a manufacturing facility with a predictable flow which suddenly changes, indicating a leak in the plant; or a leak in a coolant line; or a leak in a powdered substance delivery line. Virtually any substance with a predictable flow rate could be monitored by the present system.

Figure 3:
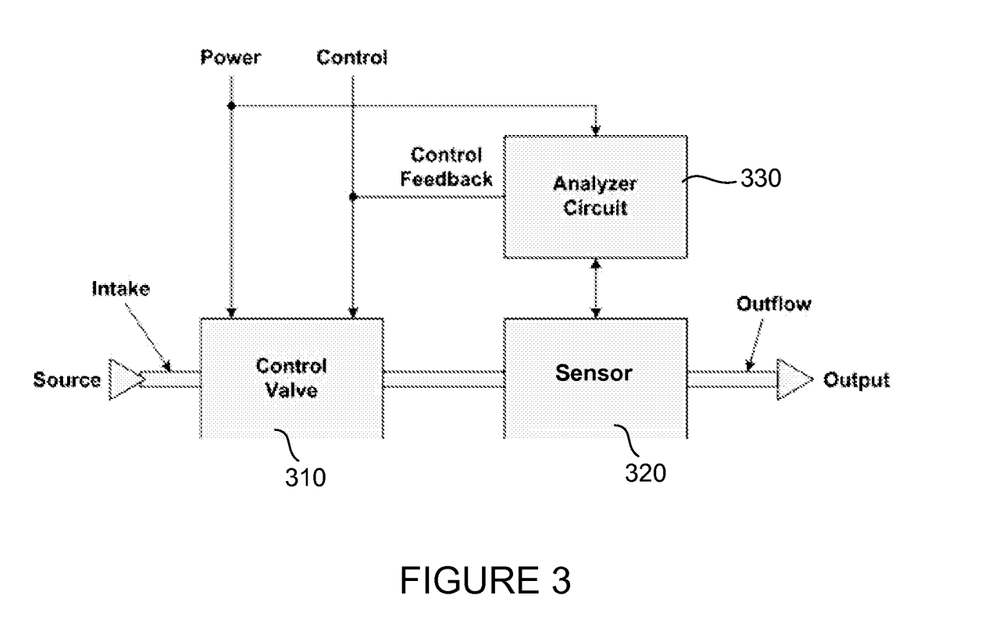
FIG. 3 is a block diagram of a water flow control system with a control valve placed after a control valve.
Figure 4:
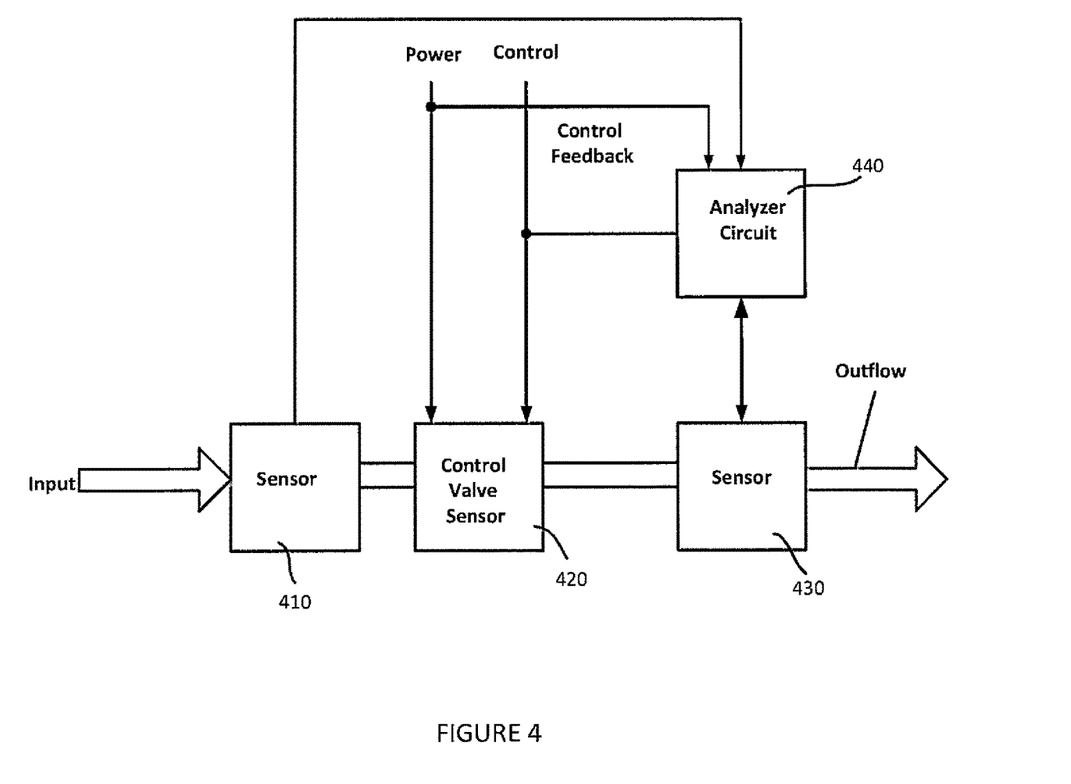
FIG. 4 is a block diagram of a water flow control system with a control valve placed before a control valve.

A water flow sensor may be implemented in any of several locations. FIG. 3 is a block diagram of a water flow control system with a control valve placed after a control valve. The water flow control system of FIG. 3 includes a control valve 310, analyzer circuit 320 and sensor 330. The sensor may be placed after the control valve to detect water flow anomalies, such as water flow that is outside a specified range centered on a baseline, for output water flow. FIG. 4 is a block diagram of a water flow control system with a control valve placed before a control valve. The water flow control system of FIG. 4 includes sensor 410, control valve with sensor 420, analyzer circuit 440 and sensor 430. In the system of FIG. 4, the sensor may be placed in the output flow (sensor 430), in the input of water flow (sensor 410), and within the control valve itself (sensor 420).

Figure 5:
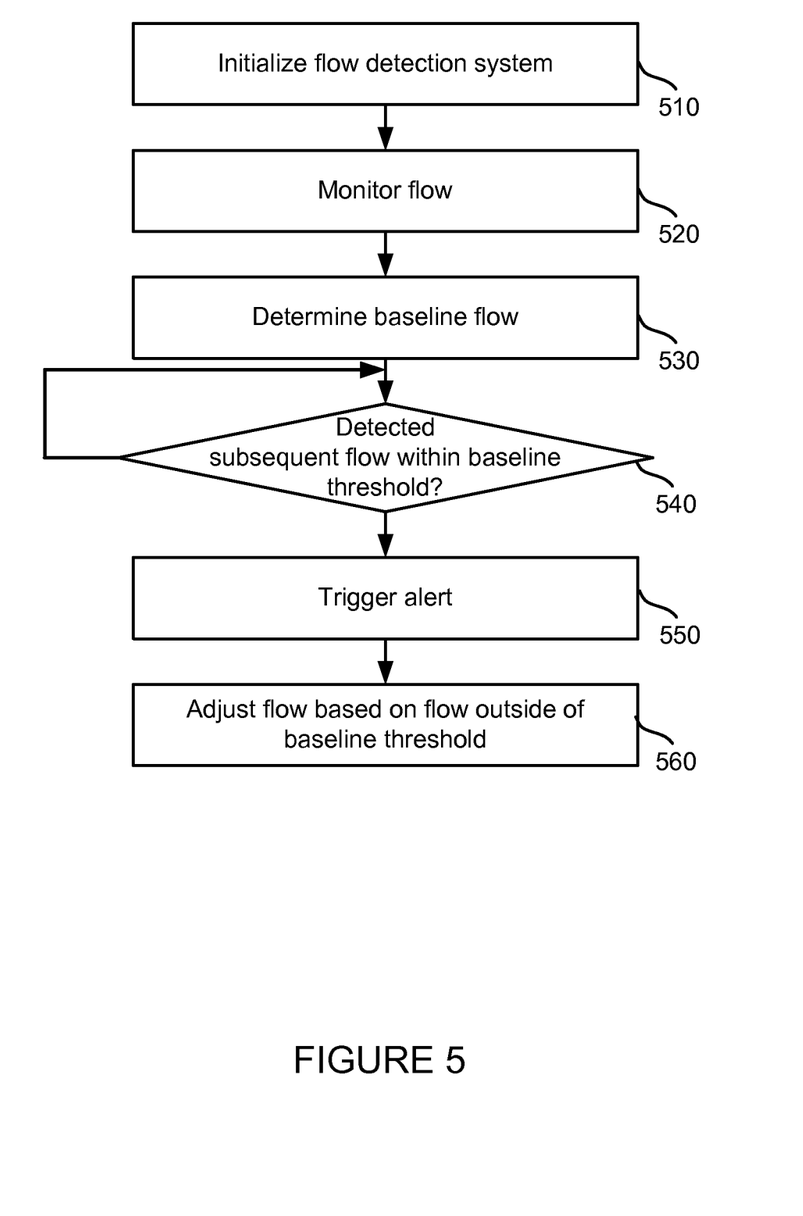
FIG. 5 illustrates a method for detecting fluid flow.

FIG. 5 illustrates a method for detecting fluid flow. The method beings with initializing a flow detection system at step 510. Initializing a system may include powering the system on, allowing for initialization tasks to complete, and other task. In some instances, initializing a flow detection system includes providing input to instruct the system to determine a baseline of fluid flow.

Fluid flow may be monitored at step 520. The flow may be monitored for a specific period of time, such as for example one hour, four hours, one day, one week, one month, or some other period of time. In some instances, the fluid may be monitored until the system is powered down. In some instances, the fluid may be monitored for a period of time to determine a baseline flow at step 530. The baseline flow may be determined as an average fluid flow over a period of time. The baseline may be determined for an individual branch of a fluid flow system or for a plurality of branches.

A determination may be made as to whether the subsequent flow is detected to be within a baseline threshold at step 540. The baseline threshold may be set within a range of the baseline. For example, the threshold may be set for plus and minus 10% of the threshold, within a standard deviation for an average value of the flow, or be set as some other value with respect to the average. In some embodiments, multiple thresholds may be set, such as for example a first threshold (e.g., at a second deviation) at which an alert may be triggered and a second threshold (e.g., at a third deviation) at which the fluid flow may be reduced or stopped. If the detected flow is within the baseline threshold, the method may remain at step 540 where subsequent flow is compared to the threshold. In some embodiments, the baseline may evolve over time as flow continues.

If the detected flow is not within a baseline threshold, an alert may be triggered at step 550. The alert may indicate the value of flow as well as other information, such as the time, particular branch detected, and so forth. The flow may be adjusted based on the detected flow determined to be outside the baseline threshold at step 560. The flow adjustment may include reducing the flow, increasing the flow, or stopping the flow for some period of time.

The present system may leverage some of the infrastructure already in place for watering systems such as manifold, timers, etc. We suspect that there are inventions in the marketplace that measure fluid movement. The uniqueness of this Invention is combining existing mechanical technology with programmable microchip technology which is highly flexible and can be adaptable to a broad range of applications. Based on our preliminary research by the major water irrigation companies, there is no apparent application of the combination of these two technologies in the marketplace.

The present technology relates to a method of preventing excessive water flow and loss from an incorrectly operating or malfunctioning landscape or agricultural watering system that typically includes the timer, manifold(s), valve(s), piping, sprinkler heads, drip irrigation systems or any other type of water distribution system, collectively referred to as the "Watering System". Current Watering Systems have a dedicated water source which is connected to a water valve, the "Valve", which is controlled by a low voltage power supply connected to a control box or timer, the "Timer". The Timer sends a signal to the Valve at programmed days and times and controls the Valve which turns on or off a branch of the Watering System. Generally, a Timer controls several Valves which are dedicated to a series of sprinklers or drip irrigation Watering Systems. When the Valve switches on, water flows from the supply through the Valve to all of the emitters in the lines serviced by that specific Valve. If any portion of the Watering System fails, excess water is not directed correctly and results in water loss. Current Valves simply turn off or on at designated days and times the flow of water and do not recognize if there are anomalies in water flow rates.

The present system is a device that can be easily installed at an individual Valve or a series of Valves and uses the existing power supply to control the device and the Valve and can be viewed as a circuit breaker as commonly found in electrical installations. When there are anomalies in the Watering System, the present system, by using a combination of micro-chip programmable technology and mechanical water flow metering can detect these anomalies and when they are in excess of prescribed tolerances, will send a signal to the Manifold and in effect would "trip the switch" and turn off the water supply for that station. The Timer would continue to go through its normal programming to the next watering station. The present system would be programmed to reset itself so that when the Timer subsequently sends the signal to the Valve, the present system would go through the same routine and if the anomaly is again dedicated, will again turn off that Valve. Alternatively, the system could be programmed to keep the Valve turned off until it was manually reset. The present system would have an indicator which would notify the user that there is a malfunction in the Watering System. The tolerances of the present system would be able to detect anomalies for all types of Watering Systems.

The system may include a button that when activated initiates a process for the controller to "learn" the normal flow rate of the sprinkler or drip irrigation system. Each system may be considered a separate branch of the irrigation system. For example, from the main water line, there may be a manifold which branches off into between 2-4 valves which are operated by low voltage and controlled by the timer. As an example, branch 1 can be the front of the yard sprinkler heads with 8 stations; branch 2 can be another 8 sprinklers heads for the rear section of the front yard. Branch 3 & 4 can be two distinct systems that serve as the drip irrigation for plants and bushes. In all scenarios, the device may be installed into each branch and learn the normal rate of water flow irrespective if is a sprinkler or drip irrigation system. A separate manifold is usually installed to service the irrigation requirements of the back yards and the same principals apply.

As a basis for measurement, the system may learn the normal flow rate of rate for a functioning sprinkler system or drip irrigation system. The learning button may be depressed and in a short period of time, for example thirty seconds, once the system is fully engaged, and the system may learn the normal water rate at that time. Each branch may have unique characteristics which differentiate what is normal as compared to the other branches due to the number of stations, gravity and distance covered. Once the system has learned the flow rates of a functioning system, an indicator or alert, such as an LED light, will, for example, remain green to indicate that it has "learned" the flow rate.

In embodiments, one or more controllers can be installed on the upstream portion of the water shut-off value. That is, residential water comes into the valve and is controlled, either off or on, by the valve. Another version of this would be installed and positioned between the main water source and the manifold, effectively having the ability to control water to all stations. In this situation, there would be a master controller valve installed above the manifold which then would be able to communicate with each individual shut off valves and which would measure water flow. If there is an issue with abnormal water flow, the master valve could shut off water to the entire manifold. This configuration may be beneficial in case of a faulty situation in the manifold itself which commonly occurs. The significance of this configuration is that the collective upstream valve will not only monitor the water coming into the manifold, it communicates to each station and through redundancy can shut off the flow going into the valve or separately and independently shut off only the station where a leak is detected. For purposes of terminology, the parent valve is between the city water source and manifold and the Branch valve regulates a particular branch downstream of the manifold.

Many cities have water requirements and restrictions to watering based on the time of day and the day of the year. The parent and/or branch devices can be pre-programmed to be in compliance with the watering rules based on the water agency guidelines. As an example, in the summer, no watering is allowed between the hours of 11:00 am to 7:00 PM. The parent and/or branch can be programmed to ensure that the watering requirements are met. The watering requirements also make distinctions between the times a sprinkler can run versus that of a drip irrigation system.

The present system may incorporate or be able to access a calendar that will automatically adjust to the changes in the allowed watering times based on the time of year and local watering guidelines. There are currently lighting devices that are available with a built in time and date calendar adjustable to the time zone of the installation, with the ability to shift to DST. This is similar concept for the present system. The logic for this particular functionality can be programmed in the timer or the Parent/Branch Devices. The present technology can incorporate a USB or similar adapter that the homeowner or landscaper can plug into and set the water times, or any other direct or remote communication method.

A critical component of any system malfunction is a warning system that alerts the owner that there may be a problem. One method of solving this would be to have a red LED light on the Parent or Branch device which shows the system is not operating under green mode. This can be accompanied by a beeping or periodic chirping coming from the Parent or Branch Device. A second option would utilize the home's wireless network which will generally extend around the perimeter of the residence and through a dedicated smart phone or tablet application can push email or text notifications of a problem. The user can access the application and the system is designed to pinpoint where there may be a problem. Other options would be utilization of various visible indicators, audible indicators, communications to other devices, or any combination thereof.

The application will be able to measure the water flow for a particular valve or branch and calculate the amount of water being utilized. The current timer clock would enable the homeowner to adjust the watering times, thus providing some override to the regulated watering times because of the vast differences in needs which is based on total plants and grass being irrigated.

The application may also have a "Rain" function which the user can simply toggle to Rain which bypasses and suppresses the watering for that day or other periods as the user defines. The application may be programmed to automatically toggle off of Rain mode after a specified period of time. It could also incorporate a rain sensor to automatically detect the presence of sufficient precipitation.

The present system learns the normal flow of water through each valve. Based on the flow of water, the present system may be able to determine gallons used for a period of time which could be by watering cycle, day or month. This information would be delivered to the application and provide the user with water usage for a specified time. This feature accomplishes the goals of providing visibility of water usage to the user and also serves as a backup warning which may show if the device is not functioning properly and warrants attention.

Another unique function of the present device would be that the device would not be overly intrusive to install and the intention is "lay over" an existing system which would minimize the need for extensive digging up of pipes and plumbing the manifold or individual stations.

The system may also be designed to protect from insufficient watering, as another problem which happens quite often is that a sprinkler head or drip irrigation becomes clogged and fails to deliver water as needed. The present device will measure when there are decreases in water flow downstream due to a faulty device, and will recognize when there is a pressure build up when a particular sprinkler hear or bubbler is clogged. In this instance, the system or branch may not turn off but rather through any method of indication would notify the homeowner that the system needs to be inspected.

The invention claimed is:

1. A method for monitoring and controlling water flow in a sprinkler system including a plurality of water pipe branches, the method comprising:
    measuring water flow through each of the plurality of water pipe branches for a predetermined period of time;
    determining a baseline water flow level for each of the plurality of water pipe branches by an electronic circuit, in response to water flow measurements through each of the plurality of water pipe branches;
    estimating a threshold for each of the plurality of water pipe branches, based on one or more of the baseline and water pressure in a respective water pipe branch, for each of the plurality of water pipe branches; and
    adjusting the water flow in one or more of the plurality of water pipe branches of the sprinkler system by the electronic circuit by:
        receiving, by the electronic circuit, a first signal from one or more pressure or flow sensors of the one or more of the plurality of water pipe branches;
        determining, by the electronic circuit, whether the water flow in said one or more of the plurality of water pipe branches exceeds the baseline by an amount more than the estimated threshold for the one or more of the plurality of water pipe branches, based on the first signal; and
        when the baseline for a particular water pipe branch exceeds the threshold for said particular water pipe branch, generating, by the electronic circuit, a second signal to reduce or stop water flow only in said particular water pipe branch.

2. The method of claim 1, further comprising monitoring, by the pressure or flow sensor, water flow through each of the plurality of water pipe branches, wherein each of the plurality of water pipe branches comprises: a manifold for accepting the water flow and a control valve for controlling flow of water to a branch of the sprinkler system.

3. The method of claim 2, wherein the pressure or flow sensor is placed after a respective control valve in the water flow.

4. The method of claim 2, wherein the pressure or flow sensor is placed before a respective control valve in the water flow.

5. The method of claim 2, wherein the pressure or flow sensor is placed inside a respective control valve in the water flow.

6. The method of claim 1, wherein the threshold is based on a standard deviation of the baseline.

7. A system for monitoring and controlling water flow in a sprinkler system including a plurality of water pipe branches, comprising:
    a pressure or flow sensor for measuring water flow through each of the water pipe branches for a predetermined period of time;
    a manifold in each of the plurality of water pipe branches for accepting the water flow in respective each of the plurality of water pipe branches;
    an electronic circuit in communication with the each of pressure or flow sensor;

a control valve in each of the plurality of water pipe branches for controlling flow of water to a respective water pipe branch; and a controller in communication with the control valves; wherein the electronic circuit determines a baseline water flow level for each of the plurality of water pipe branches based on data received from a respective pressure sensor or flow sensor, wherein the electronic circuit estimates a threshold for each of the plurality of water pipe branches, based on one or more of the baseline and water pressure in a respective water pipe branch, for each of the plurality of water pipe branches, wherein the electronic circuit determines whether the water flow in said one or more of the water pipe branches exceeds the baseline by an amount more than the estimated threshold for said one or more of the water pipe branches, based on a first signal, and wherein when the baseline for a particular water pipe branch exceeds the threshold for said particular water pipe branch, the electronic circuit generates a second signal to the control valve for said particular water pipe branch to reduce or stop water flow only in said particular water pipe branch.

8. The system of claim 7, wherein the threshold is based on a standard deviation of the baseline.

9. The system of claim 7, wherein each pressure or flow sensor is placed after a respective control valve in the water flow.

10. The system of claim 7, wherein each pressure or flow sensor is placed before a respective control valve in the water flow.

11. The system of claim 7, wherein each pressure or flow sensor is placed in a respective control valve in the water flow.

12. The system of claim 7, wherein the pressure or flow sensor and the electronic circuit are placed external to a respective control valve and the controller.

* * * * *